US006159330A

United States Patent [19]

Spranger

[11] Patent Number: 6,159,330

[45] Date of Patent: Dec. 12, 2000

[54] PRESSURE SEALER SERRATED SEALING ROLL

[75] Inventor: Lee T. Spranger, Dover, N.H.

[73] Assignee: Moore U.S.A. Inc., Grand Island, N.Y.

[21] Appl. No.: 09/156,671

[22] Filed: Sep. 18, 1998

[51] Int. Cl.[7] .......... B32B 31/04

[52] U.S. Cl. .......... 156/290; 156/553; 156/555; 156/582

[58] Field of Search .......... 156/290, 553, 156/555, 580, 581, 582

[56] References Cited

U.S. PATENT DOCUMENTS

| | | | |
|---|---|---|---|
| 2,331,054 | 10/1943 | Shively | 154/42 |
| 2,376,253 | 5/1945 | Humphrey | 154/42 |
| 3,258,385 | 6/1966 | Lake | 156/581 |
| 3,796,423 | 3/1974 | Shuster | 270/68 A |
| 4,270,909 | 6/1981 | Ireland | 493/245 |
| 4,918,128 | 4/1990 | Sakai | 524/450 |
| 5,169,489 | 12/1992 | Kalisiak et al. | 156/555 |
| 5,180,151 | 1/1993 | Branecky et al. | 270/45 |
| 5,190,818 | 3/1993 | Sakai | 428/355 |
| 5,282,920 | 2/1994 | Fujii et al. | 156/553 |
| 5,314,944 | 5/1994 | Chao | 524/501 |
| 5,378,303 | 1/1995 | Traise | 156/555 |
| 5,397,427 | 3/1995 | Traise et al. | 156/555 |
| 5,427,851 | 6/1995 | Mehta | 428/356 |
| 5,527,416 | 6/1996 | Traise | 156/290 |
| 5,552,013 | 9/1996 | Ehlert et al. | 156/555 |
| 5,580,418 | 12/1996 | Alikhan | 156/553 |
| 5,956,930 | 9/1999 | Baker et al. | 53/460 |

FOREIGN PATENT DOCUMENTS 0 499 780 A1 8/1992 WIPO .

*Primary Examiner*—James Sells
*Attorney, Agent, or Firm*—Nixon & Vanderhye P.C.

[57] ABSTRACT

Business forms having longitudinal and transverse patterns of pressure activated cohesive requiring a sealing force of at least about 50 lbs. per lineal inch are sealed preferably by a single pass through a nip formed by first and second rollers. The first roller is a larger diameter substantially smooth surfaced roll, while the second roller is a small diameter serrated or ribbed roll, e.g. having serrations or ribs having a dimension substantially parallel to the axis of rotation of about 0.04–0.1 (e.g. about 1/16) inches, with spaces therebetween of between about 0.2–0.1 inches (e.g. between about 1/32–1/16) inches. Preferably the serrations or ribs are oppositely directed angled serrations or ribs on different halves of the second roll, each making an angle of at least about 10° with respect to a plane substantially transverse to the axis of rotation. The rolls are typically 4–12 inches in length, and when 6 inches in length or more, a reinforcing roll preferably engages the second roll to prevent bowing of the second roll.

22 Claims, 2 Drawing Sheets

FIG. 1
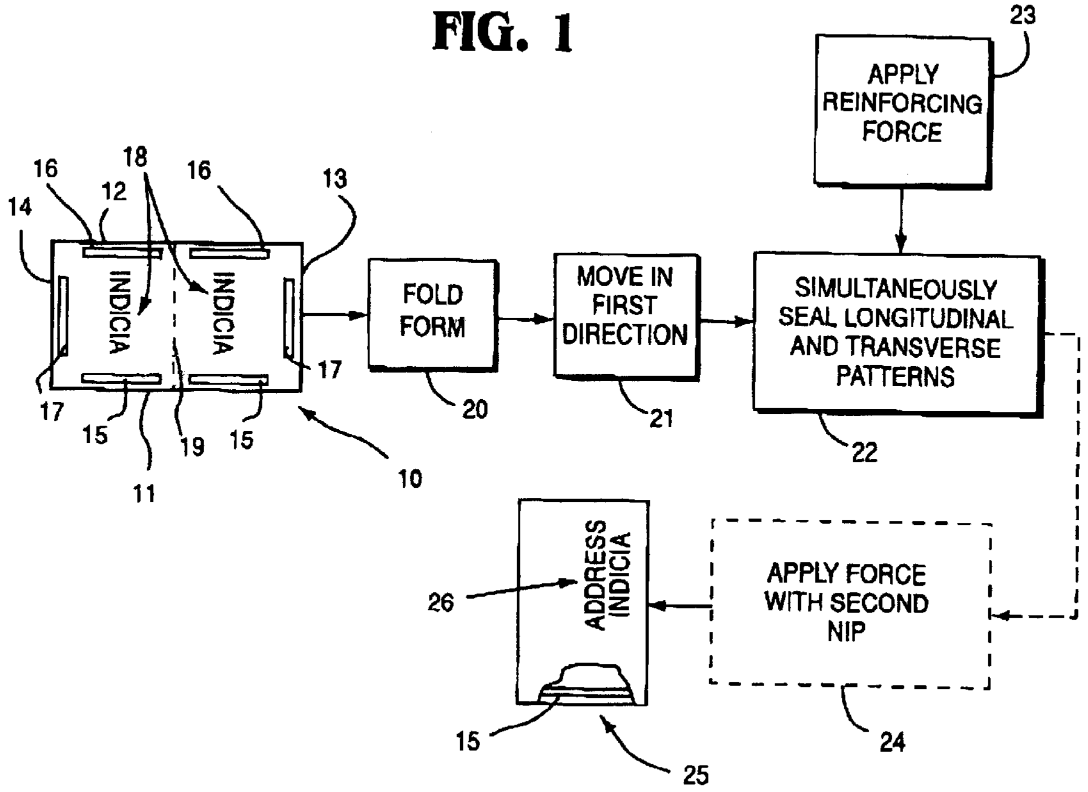
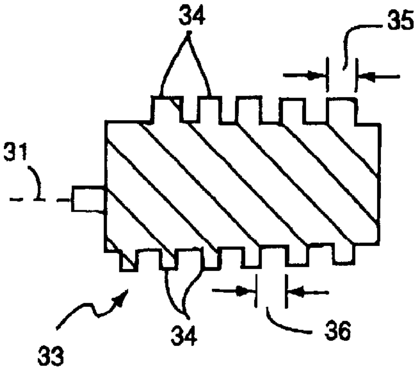
FIG. 2
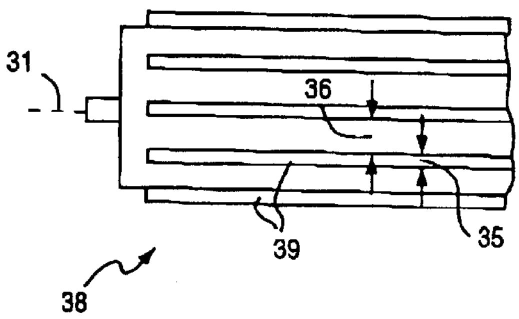
FIG. 3

PRESSURE SEALER SERRATED SEALING ROLL

BACKGROUND AND SUMMARY OF THE INVENTION

Business forms with pressure activated adhesive or cohesive have become increasingly popular because of numerous practical advantages associated therewith. These adhesives (such as sold by Toppan Forms Company of Japan with a trade designation TN124, and as disclosed in U.S. Pat. Nos. 4,918,128, 5,190,818, 5,314,944 and 5,427,851) require application of a substantial force in order to effect sealing. A wide variety of different pieces of pressure seal equipment have been developed for that purpose, such as sold by Moore U.S.A., Inc. of Lake Forest, Ill. under the trademark "SpeediSealer", and such as shown in U.S. Pat. Nos. 5,169,489, 5,378,303, 5,397,427 and 5,527,416 (the disclosures of which are hereby incorporated by reference herein). While this commercial equipment is very useful in effecting proper sealing and handling of business forms with pressure activated adhesive or cohesive, it would be desirable to reduce the weight of the equipment, and provide a lower cost to the end user.

According to the present invention a method is provided for sealing business forms connecting longitudinal and transverse patterns of pressure activated cohesive or adhesive (requiring a sealing force of at least about 50 lbs. per lineal inch, typically between about 100–200 lbs. per lineal inch) using equipment at lower cost than conventional systems such as sold by Moore U.S.A., Inc. under the trademark "SpeediSealer". By using a particular serrated or ribbed roll, and typically a larger diameter substantially smooth surfaced roll, it is possible to seal a form by passing it through only one nip. Because of the serrations or ribs, at least 50%, but less than 90%, of the cohesive is compressed. The reduction in surface compressions (that is the serrations or ribs versus the solid roll) compresses less cohesive per square inch, thus requiring less pressure and smaller roll circumference, reducing cost.

According to one aspect of the present invention a method of sealing a business form having longitudinal and transverse patterns of pressure activated cohesive or adhesive (such as described above) requiring a sealing force of at least about 50 lbs. per lineal inch is provided. The method comprises: (a) moving the business form in a first direction substantially parallel to a longitudinal pattern of pressure activated cohesive or adhesive thereon; and (b) while the form is moving in the first direction passing the form through a nip between a substantially smooth surfaced first roll and a serrated or ribbed second roll, the roller rotated about substantially parallel axes of rotation, so as to compress at least 50%, but less than 90%, of each of the longitudinal and transverse patterns of pressure activated adhesive or cohesive, by applying a force of over 50 lbs. per lineal inch at the serrations, or ribs.

In the method (b) is preferably practiced to effect complete sealing of the business form without passage through another roller nip, and to apply a compressive force of between about 100–200 lbs. per lineal inch at the serrations or ribs. If the first and second rolls each have an overlapping length of about 6 inches or more, then the method preferably further comprises (c) applying a reinforcement force to the serrated or ribbed roll to prevent bowing thereof.

In the method, preferably (b) is practiced using a second roll with serrations approximately one-half of which have a first angled orientation and approximately one-half of which have a second angled orientation substantially opposite the first angled orientation, each orientation making an angle of at least about 10° to a plane substantially transverse to the axis of rotation of the second roll. Also, (b) may be further practiced using serrations or ribs each having a first dimension substantially parallel to the axis of rotation of between about 0.04–0.1 (e.g. about 1/16) inches, with spaces therebetween of between about 0.02–0.1 (e.g. about 1/32–1/16) inches.

Also, according to the invention, typically (a) and (b) are practiced using Z-fold, C-fold, V-fold, or double fold forms having at least four transversely spaced longitudinal strips of pressure activated cohesive, two strips adjacent each longitudinal edge of the form cooperating with each other, and at least two cooperating transverse strips of pressure activated cohesive. Also, preferably (b) is practiced using a first roll having a diameter of at least twice that of the second roll, and each of the first and second rolls has a length dimension parallel to the axis of rotation thereof of between about 4–12 inches.

According to another aspect of the present invention a sealing roll assembly is provided comprising the following components: A first smooth surfaced roll rotatable about a first axis of rotation having a length dimension parallel to the first axis of rotation of between about 4–12 inches and having a first diameter. A second roll having a ribbed or serrated surface and rotatable about a second axis of rotation parallel to the first axis and having a length dimension parallel to the second axis of between about 4–12 inches, and a second diameter. And wherein the second diameter is less than half the first diameter.

If each of the first and second rolls has a length of more than about 6 inches, the assembly further comprises a reinforcement roll engaging the second roll and rotatable about a third axis parallel to the first and second axes and substantially in-line therewith, to prevent bowing of the second roll. Typically the ribs or serrations have a first dimension substantially parallel to the axis of rotation of between about 0.04–0.1 inches, with spaces therebetween of between about 0.02–0.1 inches. Also, preferably approximately one-half of the serrations or ribs have a first angled orientation, and approximately one-half have a second angled orientation substantially opposite the first angled orientation, each orientation making an angle of at least about 10° to a plane substantially transverse to the second roll axis of rotation.

According to another aspect of the present invention a sealing roll assembly is provided comprising the following components: A first smooth surfaced roll rotatable about a first axis of rotation having a length dimension parallel to the first axis of rotation of between about 4–12 inches and having a first diameter. A second roll having a ribbed or serrated surface and rotatable about a second axis of rotation parallel to the first axis and having a length dimension parallel to the second axis of between about 4–12 inches, and a second diameter. And wherein the ribs or serrations have a first dimension substantially parallel to the axis of rotation of between about 0.04–0.1 inches, with spaces therebetween of between about 0.02–0.1 inches. Additional details of the roll assembly may be as described above.

It is a primary object of the present invention to provide a method and assembly for the relatively inexpensive yet effective sealing of business forms having pressure activated cohesive or adhesive. This and other objects of the invention will become clear from an inspection of the detailed description of the invention and from the appended claims.

BRIEF DESCRIPTION OF THE DRAWINGS

FIG. 1 is a schematic, box, diagram indicating one exemplary method according to the claimed invention;

FIG. 2 is a detail cross section view showing one form of a serrated or ribbed roll according to the present invention;

FIG. 3 is a detail front end view of the second form of the serrated or ribbed roll according to the invention.

DETAILED DESCRIPTION OF THE DRAWINGS

Figure 4:
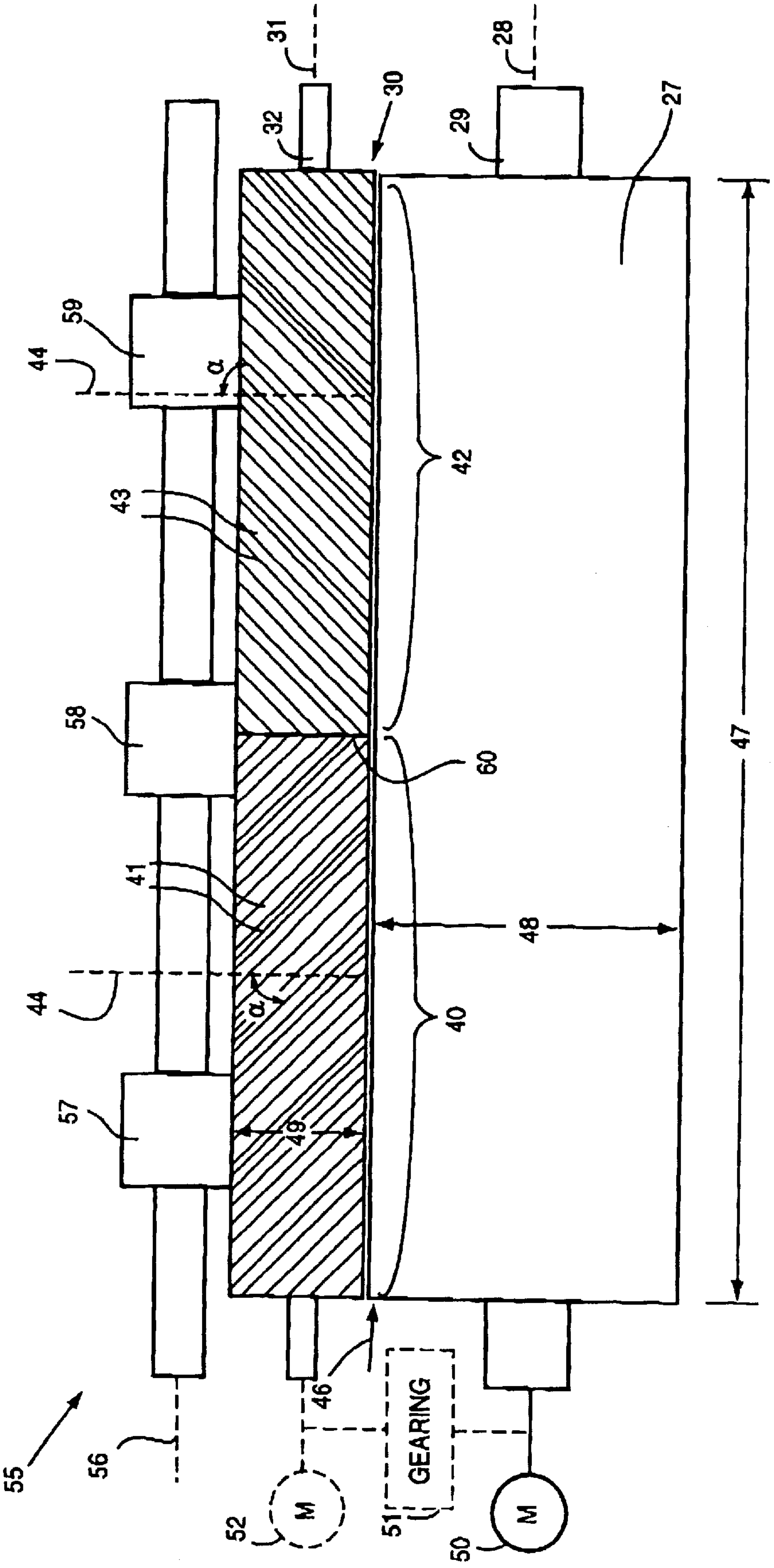
FIG. 4 is a side view of an exemplary sealing roll assembly according to the present invention.

A business form intermediate 10 that may be utilized in the practice of the present invention is illustrated schematically in FIG. 1. The intermediate 10 illustrated in FIG. 1 is a V-fold business form, but it is to be understood that the invention may be practiced with any conventional mailer type business forms such as C-fold (including eccentric C-fold), Z-fold (including eccentric Z-fold), double fold, and the like.

For the V-fold intermediate 10 illustrated schematically in FIG. 1, there are first and second longitudinal side edges 11, 12, first and second transverse edges 13, 14; a first pair of longitudinal patterns (e.g. strips) 15 of pressure activated adhesive or cohesive (such as described above), a second pair of adhesive or cohesive longitudinal patterns 16, cooperating transverse (substantially perpendicular to the longitudinal patterns) patterns 17, indicia 18, and a transverse fold line 19. The intermediate 10 is folded in conventional folding equipment 20 about the fold line 19 to move the elements 15 into contact with each other, the elements 16 into contact with each other, and the elements 17 into contact with each other. The folded over intermediate form 10 from the folder 20 is then—as indicated by box 21 in FIG. 1—moved in a first direction substantially parallel to the longitudinal patterns 15, 16 (and the longitudinal edges 11,12) of the form, using any suitable conventional equipment, such as powered rollers, the discharge from the folder 20, or the like.

While the form 10 is moving in the first direction, as indicated at 21, it passes through a nip between rolls that will hereinafter described, which have a length sufficient so that the longitudinal patterns 15, 16 and transverse patterns 17 are substantially simultaneously sealed as indicated at 22 in FIG. 1. Typically where the rolls are longer than about 6 inches, a reinforcing roller provides a reinforcing force, to prevent bowing of a serrated or ribbed roll, as schematically illustrated at 23 in FIG. 1. It may be desirable to then pass the form 10 through a second nip, such as illustrated at 24 in FIG. 1, if step 22 is not sufficient to effectively seal the form so that it is a completed mailer, as indicated schematically at 25 in FIG. 1. The mailer 25 typically has outgoing address indicia 26 thereon, and all of the pressure sensitive cohesive strips, such as 15 in FIG. 1, are sealed.

In the practice of step 22, a first substantially smooth surfaced roll 27, rotatable about a first axis of rotation 28 defined by a shaft 29, is provided as well as a second roll indicated schematically at 30 in FIG. 4, rotatable about a second axis of rotation 31 defined by the shaft 32, the axes 28, 31 parallel. One form that the second roll can take is illustrated schematically for the second roll 33 in FIG. 2, rotatable about the second axis 31. The surface of the second roll 33 has ribs or serrations, indicated by reference numerals 34 in FIG. 2, which may be circumferential, or spiral. The ribs 34 have a first dimension 35 parallel to the axis 31 which preferably is between about 0.04–0.1 inches, and preferably about 1⁄16 inch, and substantially regular spaces 36 (also seen in FIG. 2) of between about 0.02–0.1 inches (preferably between 1⁄32–1⁄16 inch), so that the ribs or serrations cover at least 50% of the active peripheral surface of the roll 33, but less than 90%, typically between about 50–67%. In this way the ribs or serrations compress at least 50%, but less than 90% (e.g. between 50–67%) of the cohesive patterns 15, 16, 17.

The second roller 30, 33 may have a wide variety of other formations of ribs or serrations. For example, the second roller 38 embodiment illustrated in FIG. 3 has a plurality of spline-simulating ribs 39 extending substantially parallel to the axis 31. In this configuration the ribs 39 typically have the same dimensions and spacing such as indicated at 35, 36 in FIG. 2.

For the embodiment illustrated in FIG. 4, the second roll 30 has ribs or serrations that are differently positioned on the different paths of the roll 30. For example, on approximately the half 40 the ribs or serrations 41 have a first angled orientation, whereas for the half 42 the ribs or serrations 43 have a second angled orientation substantially opposite the orientation for the ribs or serrations 41. In both cases the angled orientations of the ribs or serrations 41, 43 make an angle $\alpha$ with respect to a plane 44 substantially transverse to the axis of rotation 31. The angle $\alpha$ is at least 10° and preferably is between about 30–45°. The opposite orientations of the ribs or serrations 41, 43 schematically illustrated in FIG. 5 are preferably provided to prevent the form from "walking" as it is being passed through the nip 46 between the rolls 27, 30.

Also, preferred according to the present invention the rolls 27, 30 each have a length 47 (the dimension parallel to the axes of rotation 28, 31) of between about 4–12 inches, typically 6 inches or more. Also, the roll 27 preferably has a diameter 48 that is at least twice as great as the diameter 49 of the second roll 30 (e.g. about three times as large as illustrated in the embodiment of FIG. 4). In the preferred embodiment the diameter 48 is between about two-ten inches, and the diameter 49 is preferably between about four–1⁄8 inches.

The rollers 27, 30 can be powered in any manner desired. For example, an electric motor 50 may rotate the shaft 29 about the axis 28, with the second roll 30 then powered by movement of the business form 25 between the rollers 27, 30. Alternatively, gearing 51 may be provided for effecting rotation of the shaft 32 so that the peripheral surface of the roll 30 has a tangential velocity substantially the same as the tangential velocity of the roller 27. Alternatively, a second motor 52 may be provided for powering the second roller 30, or the motor 52 may be the only motor utilized.

The roll assembly of FIG. 4 typically provides a force at the ribs or serrations 41, 43, of at least about 50 lbs. per lineal inch so as to effectively seal the cohesive 15, 16, 17. Typically, the sealing force provided at the nip 46, where the serrations or ribs 41, 43, are provided, is between about 100–200 lbs. per lineal inch. Also, the rolls 27, 30 can be rotated at a slower speed than is conventional, e.g. a speed of about 300 rpm for the roller 27. For sealing rolls in conventional SpeediSealer® equipment the rpm is about 600.

Where the length 47 is about 6 inches or more, a reinforcing roll/shaft—shown generally at 55 in FIG. 4—is provided. The reinforcing roll/shaft 55 is rotatable about the axis 56 which is parallel to the axes 28, 31, and preferably the axes 28, 31, 56 are substantially coplanar (preferably in a common substantially vertical plane), that is the roll/shaft 55 is substantially opposite the roll 27, with the second roll 30 therebetween. One form that the roll/shaft 55 may have, which is preferred, is three or four roll segments 57, 58, 59 thereon which are spaced from each other along the axis of rotation 56 and which engage the roller 30 at the middle and adjacent (but spaced from that) both ends thereof, as illustrated in FIG. 4. Alternatively two roll segments 58 may be provided, one on either side of the center 60 of the roll 30. The reinforcement roll/shaft 55 provides a force on the roll 30 preventing bowing or undesired deflection thereof.

It will thus be seen that according to the present invention a desirable method and assembly have been provided for the sealing of business forms having pressure activated cohesive or adhesive thereon. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and assemblies.

What is claimed is:

1. A method of sealing a business form having longitudinal and transverse patterns of pressure activated cohesive or adhesive requiring a sealing force of at least about 50 lbs. per lineal inch, comprising:

(a) moving the business form in a first direction substantially parallel to a longitudinal pattern of pressure activated cohesive or adhesive thereon; and (b) while the form is moving in the first direction passing the form through a nip between a substantially smooth surfaced first roll and a serrated or ribbed second roll, the rolls rotated about substantially parallel axes of rotation, so as to compress at least 50%, but less than 90%, of each of the longitudinal and transverse patterns of pressure activated adhesive or cohesive, by applying a force of over 50 lbs. per lineal inch at the serrations, or ribs.

2. A method as recited in claim 1 wherein (b) is practiced to effect complete sealing of the business form without passage through another roller nip.

3. A method as recited in claim 2 wherein (b) is practiced to apply a compressive force of between about 100–200 lbs. per lineal inch at the serrations or ribs.

4. A method as recited in claim 3 wherein the first and second rolls each have an overlapping length of about 6 inches or more, and further comprising (c) applying a reinforcement force to the serrated or ribbed roll to prevent bowing thereof.

5. A method as recited in claim 1 wherein (b) is practiced using a second roll with serrations approximately one-half of which have a first angled orientation and approximately one-half of which have a second angled orientation substantially opposite the first angled orientation, each orientation making an angle of at least about 10° to a plane substantially transverse to the axis of rotation of the second roll.

6. A method as recited in claim 5 wherein (b) is further practiced using serrations or ribs each having a first dimension substantially parallel to the axis of rotation of between about 0.04–0.1 inches, with spaces therebetween of between about 0.02–0.1 inches.

7. A method as recited in claim 6 wherein (b) is further practiced using a second roll wherein the first dimension of the serrations is about 1/16 inch, and the spacing therebetween is between about 1/32 and 1/16 inch.

8. A method as recited in claim 1 wherein (a) and (b) are practiced using Z-fold, C-fold, V-fold, or double fold forms having at least four transversely spaced longitudinal strips of pressure activated cohesive, two strips adjacent each longitudinal edge of the form cooperating with each other, and at least two cooperating transverse strips of pressure activated cohesive.

9. A method as recited in claim 1 wherein (b) is practiced using a first roll having a diameter of at least twice that of the second roll, and each of the first and second rolls has a length dimension parallel to the axis of rotation thereof of between about 4–12 inches.

10. A method as recited in claim 1 wherein (b) is practiced using a second roll having ribs or serrations each having a first dimension substantially parallel to the axis of rotation of between about 0.04–0.1 inches, with spaces therebetween of between about 0.02–0.1 inches.

11. A method as recited in claim 7 wherein (b) is further practiced using a second roll wherein the first dimension of the serrations or ribs is about 1/16 inch, and the spacing therebetween is between about 1/32 and 1/16 inch.

12. A method as recited in claim 10 wherein (b) is practiced to effect complete sealing of the business form without passage through another roller nip.

13. A method as recited in claim 12 wherein (b) is practiced to apply a compressive force of between about 100–200 lbs. per lineal inch at the serrations or ribs.

14. A method as recited in claim 13 wherein the first and second rolls each have an overlapping length of about 6 inches or more, and further comprising (c) applying a reinforcement force to the serrated or ribbed roll to prevent bowing thereof.

15. A method as recited in claim 1 wherein the first and second rolls each have an overlapping length of about 6 inches or more, and further comprising (c) applying a reinforcement force to the serrated or ribbed roll to prevent bowing thereof.

16. A sealing roll assembly comprising:

a first smooth surfaced roll rotatable about a first axis of rotation having a length dimension parallel to the first axis of rotation of between about 4–12 inches and having a first diameter;

a second roll having a ribbed or serrated surface and rotatable about a second axis of rotation parallel to said first axis and having a length dimension parallel to said second axis of between about 4–12 inches, and a second diameter; and wherein said second diameter is less than about half said first diameter; and wherein said ribs or serrations have a first dimension substantially parallel to the axis of rotation of between about 0.04–0.01 inches, with spaces therebetween of between about 0.02–0.1 inches.

17. An assembly as recited in claim 16 wherein each of said first and second rolls has a length of more than about 6 inches; and further comprising a reinforcement roll engaging said second roll and rotatable about a third axis parallel to said first and second axes and substantially in-line therewith, to prevent bowing of said second roll.

18. An assembly as recited in claim 16 wherein approximately one-half of said serrations or ribs have a first angled orientation, and approximately one-half have a second angled orientation substantially opposite said first angled orientation, each orientation making an angle of at least about 10° to a plane substantially transverse to said second roll axis of orientation.

19. A sealing roll assembly comprising:

a first smooth surfaced roll rotatable about a first axis of rotation having a length dimension parallel to the first axis of rotation of between about 4–12 inches and having a first diameter;

a second roll having a ribbed or serrated surface and rotatable about a second axis of rotation parallel to said first axis and having a length dimension parallel to said second axis of between about 4–12 inches, and a second diameter; and wherein said ribs or serrations have a first dimension substantially parallel to the axis of rotation of between about 0.04–0.1 inches, with spaces therebetween of between about 0.02–0.1 inches.

20. An assembly as recited in claim 19 wherein each of said first and second rolls has a length of more than about 6 inches; and further comprising a reinforcement roll engaging said second roll and rotatable about a third axis parallel to said first and second axes and substantially in-line therewith, to prevent bowing of said second roll.

21. An assembly as recited in claim 19 wherein approximately one-half of said serrations or ribs have a first angled orientation, and approximately one-half have a second angled orientation substantially opposite said first angled orientation, each orientation making an angle of at least about 10° to a plane substantially transverse to said second roll axis of orientation.

22. A sealing roll assembly comprising:

a first smooth surfaced roll rotatable about a first axis of rotation having a length dimension parallel to the first axis of rotation of between about 4–12 inches and having a first diameter;

a second roll having a ribbed or serrated surface and rotatable about a second axis of rotation parallel to said first axis and having a length dimension parallel to said second axis of between about 4–12 inches, and a second diameter; and wherein said second diameter is less than about half said first diameter;

wherein each of said first and second rolls has a length of more than about 6 inches; and a reinforcement roll engaging said second roll and rotatable about a third axis parallel to said first and second axes and substantially in-line therewith, to prevent bowing of said second roll.

* * * * *